United States Patent
Sogawa (10) Patent No.: US 6,381,360 B1
(45) Date of Patent: Apr. 30, 2002

(54) APPARATUS AND METHOD FOR STEREOSCOPIC IMAGE PROCESSING

(75) Inventor: Yoshiyuki Sogawa, Tokyo (JP)

(73) Assignee: Fuji Jukogyo Kabushiki Kaisha, Tokyo-To (JP)

( * ) Notice: Subject to any disclaimer, the term of this patent is extended or adjusted under 35 U.S.C. 154(b) by 0 days.

(21) Appl. No.: 09/665,947

(22) Filed: Sep. 21, 2000

(30) Foreign Application Priority Data

Sep. 22, 1999 (JP) .......................................... 11-269553

(51) Int. Cl.[7] .................................................. G06K 9/00
(52) U.S. Cl. ...................................... 382/154; 348/116
(58) Field of Search ................................ 382/154, 153, 382/151, 294, 278; 348/113, 116, 118, 117, 122, 127, 143, 148

(56) References Cited

U.S. PATENT DOCUMENTS 5,410,346 A * 4/1995 Saneyoshi et al. .......... 348/118
5,581,638 A * 12/1996 Givens et al. .............. 382/294
5,808,591 A * 9/1998 Mantani ....................... 345/82

FOREIGN PATENT DOCUMENTS

JP          10-307352          11/1998

* cited by examiner

*Primary Examiner*—Andrew W. Johns
*Assistant Examiner*—Seyed Azarian
(74) *Attorney, Agent, or Firm*—Smith, Gambrell & Russell, LLP (57) ABSTRACT

After processing images photographed by a stereo camera apparatus, parallaxes are detected by stereo matching. Influence of a difference in the focal lengths of lenses and distortion of the lenses, and of relative variations in shooting directions of two cameras constituting the stereo camera apparatus is excluded to achieve an improvement in the accuracy of distance by correcting parallax data using a view angle correction ratio table 29 produced by previously measuring data on a small actual view angle of each specific region in a comparative image.

14 Claims, 7 Drawing Sheets

APPARATUS AND METHOD FOR STEREOSCOPIC IMAGE PROCESSING

BACKGROUND OF THE INVENTION

1. Field of the Invention

The present invention relates to an apparatus and a method for stereoscopic image processing which process a pair of images photographed by a stereo camera apparatus and then obtain parallax data as three-dimensional distance information.

2. Description of the Related Art

Generally, image processing by a so-called stereo method is known as an image-based three-dimensional measuring technique. In this stereo method, an object is photographed from different positions with a stereo camera apparatus which is composed of two cameras, a correlation between a pair of images thus photographed is determined, a parallax of the same object in a pair of images is obtained based on the correlation and a distance from the stereo camera apparatus to the object is determined from the parallax of the same object using camera parameters based on the principle of triangulation. The camera parameters are the mounting position and focal length of the stereo camera apparatus, etc.

In the image processing by the stereo method, two image signals from the stereo camera apparatus are overlapped while successively shifting one image signal, and then a position where the two image signals coincide with each other is obtained. Accordingly, it is primarily preferable that only a positional deviation by the parallax exists between the two images. Should there exist another positional deviation caused by an optical distortion, for instance, it would cause a mismatching problem, resulting in a decrease in the accuracy of distance information.

Under these circumstances, the present applicant proposed a technique of performing an electrical adjustment without making any mechanical adjustment as shown in Japanese Patent Unexamined Publication No. Hei. 10-307352. The electrical adjustment is performed by executing an affine transformation according to a deviation of the optical position of the stereo camera apparatus. This technique makes it possible to precisely adjust the optical position of the stereo camera apparatus to such a level that is difficult to achieve by mechanical adjustment. Also the technique makes it possible to easily re-adjust a deviation due to changes under aging phenomena after adjustment.

Correction of an image based on the affine transformation previously proposed by the present applicant is a linear correction which works uniformly on the entire image for prevent deterioration of image quality. However, the correction of the image is not intended to cope with nonlinear deviations, such as variations in lens properties, for instance, the focal length of lenses or distortion of the lenses, or relative variations in the shooting directions of two cameras.

Figure 10:
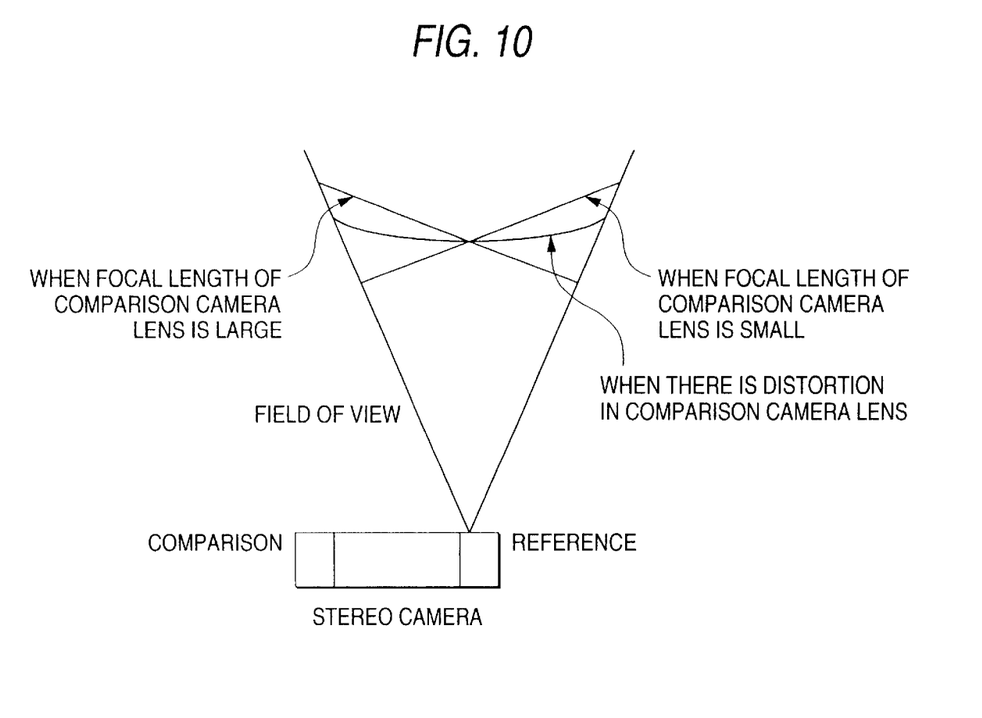
FIG. 10 is an explanatory diagram showing changes of equidistant surfaces due to variations in lens properties.

Specifically, a distance distribution obtained should ideally give a flat plane when an object like a wall which is parallel to the baseline of a stereo camera apparatus and located at an equal distance from the stereo camera apparatus is photographed. However, there can arise a problem that an equidistant surface inclines due to an influence of a difference between the focal length of the lens of the camera of a reference side and the focal length of the lens of the camera of a comparison side as shown in FIG. 10. Also, there can arise a problem that the equidistant surface does not form a flat plane due to an influence of the distortion of the lens of the comparison side as shown in FIG. 10. These problems cause a decrease in the accuracy of distance measurement.

SUMMARY OF THE INVENTION

This invention has been made in consideration of the aforementioned circumstances. Accordingly, it is an object of the invention to provide an apparatus and a method for stereoscopic image processing which can correct parallax detection errors caused by variations in lens properties or relative variations in shooting directions of two cameras constituting a stereo camera apparatus, and thereby improve the accuracy of distance measurement.

The object can be achieved by a stereoscopic image processing apparatus which comprises: a search unit; a parallax calculating unit; and a parallax correcting unit. The search unit searches a corresponding small region in a comparative image corresponding to a small region in a reference image. The comparative image and the reference image are photographed with a stereo camera apparatus. The parallax calculating unit obtains a parallax data of the small regions. The parallax correcting unit corrects the parallax data based on ratios of view angles. The ratio of view angles is a ratio of a small actual view angle of each predetermined region in the comparative image to an ideal view angle of the each predetermined region when optical position of the stereo camera apparatus is in an ideal state.

In the stereoscopic image processing apparatus of the invention, it is preferable that the parallax correcting unit corrects the parallax data on the basis of the ratio of view angles corresponding to a matching point in the comparative image where the corresponding small region matches with the small region in the reference image, and the ratio of view angles corresponding to an infinite distance corresponding point for the small region.

Further, in the stereoscopic image processing apparatus of the invention, it is preferable that the parallax correcting unit has a correction data table based on the ratio of view angles, and corrects the parallax data in reference to correction data of the correction data table. The correction data table may include a first table to be referenced at matching points in the comparative image where the corresponding small regions match with the small regions in the reference image and a second table to be referenced at infinite distance corresponding points. Correction data of the correction data table, the first table and the second table may be integrated values obtained by integrating the ratio of the view angles from a side edge of the comparative image.

Furthermore, in the above-mentioned stereoscopic image processing apparatus, it is also preferable that the parallax correction unit corrects the parallax data based on integrated values obtained by integrating the ratio of the view angles from a side edge of the comparative image.

The above-mentioned object can be achieved by a stereoscopic image processing method which comprises: searching a corresponding small region in a comparative image corresponding to a small region in a reference image, the comparative image and the reference image being photographed with a stereo camera apparatus; obtaining a parallax data of the small regions; and correcting the parallax data based on a ratio of view angles, the ratio of view angles being a ratio of a small actual view angle of each predetermined region in the comparative image to an ideal view angle of the each predetermined region when optical position of the stereo camera apparatus is in an ideal state.

In the stereoscopic image processing method of the invention, it is preferably advantageous that the step of correcting the parallax corrects the parallax data on the basis of the ratio of view angles corresponding to a matching point in the comparative image where the corresponding small region matches with the small region in the reference image, and the ratio of view angles corresponding to an infinite distance corresponding point.

Further, in the stereoscopic image processing method of the invention, it is advantageous that the step of correcting the parallax comprises: preparing a correction data table based on the ratio of view angles; and correcting the parallax based on correction data of the correction data table. The step of preparing correction data table may prepare a first table to be referenced at matching points in the comparative image where the corresponding small regions match with the small regions in the reference image and a second table to be referenced at infinite distance corresponding points. The step of correction the parallax may prepare the correction data table, the first table and the second table based on integrated values obtained by integrating the ratio of the view angles from a side edge of the comparative image.

Furthermore, in the above-mentioned stereoscopic image processing method, it is also advantageous that the step of correction the parallax corrects the parallax data based on integrated values obtained by integrating the ratio of the view angles from a side edge of the comparative image.

DETAILED DESCRIPTION OF THE PREFERRED EMBODIMENT

Figure 1:
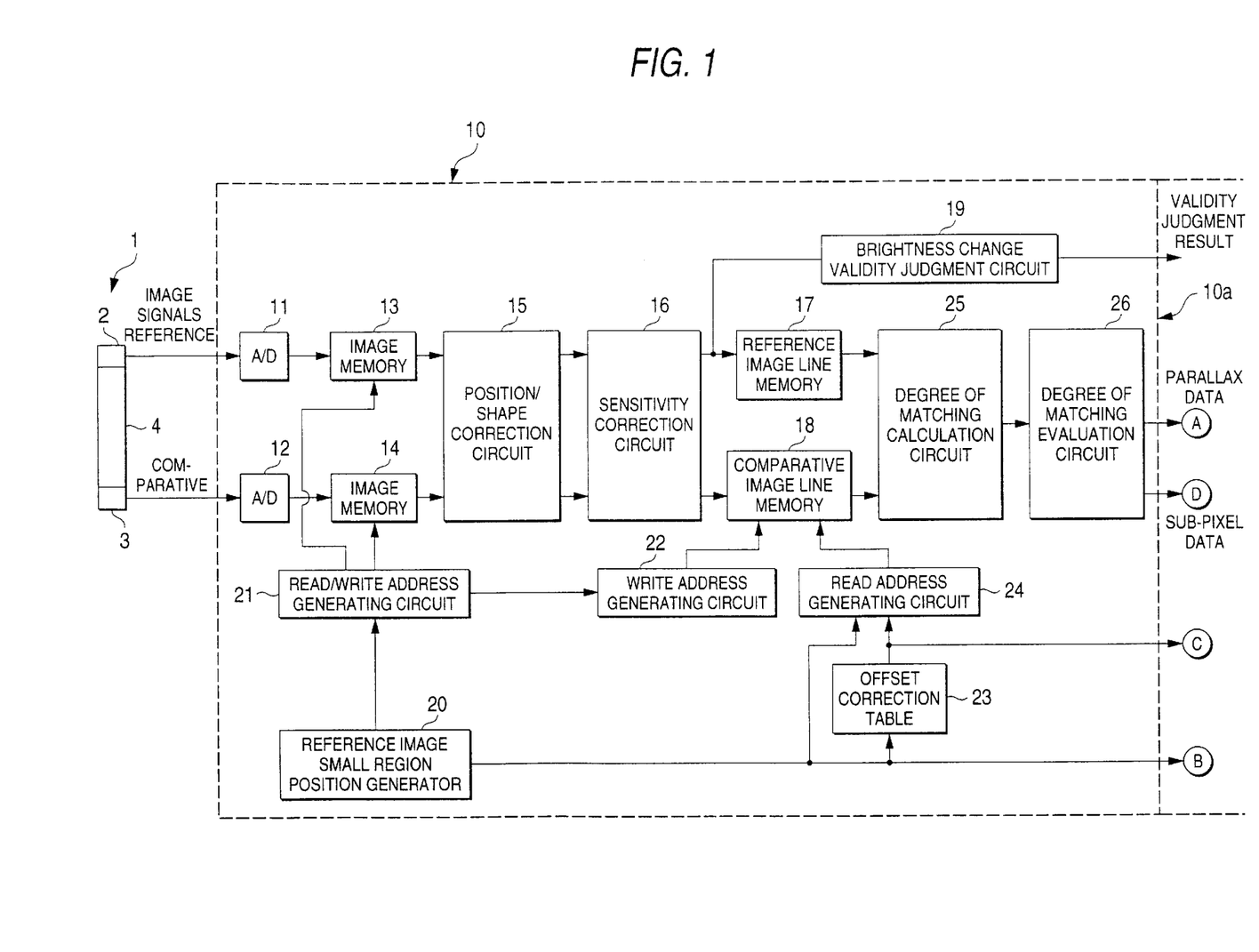
FIG. 1 is a circuit block diagram of a stereoscopic image processing apparatus.
Figure 2:
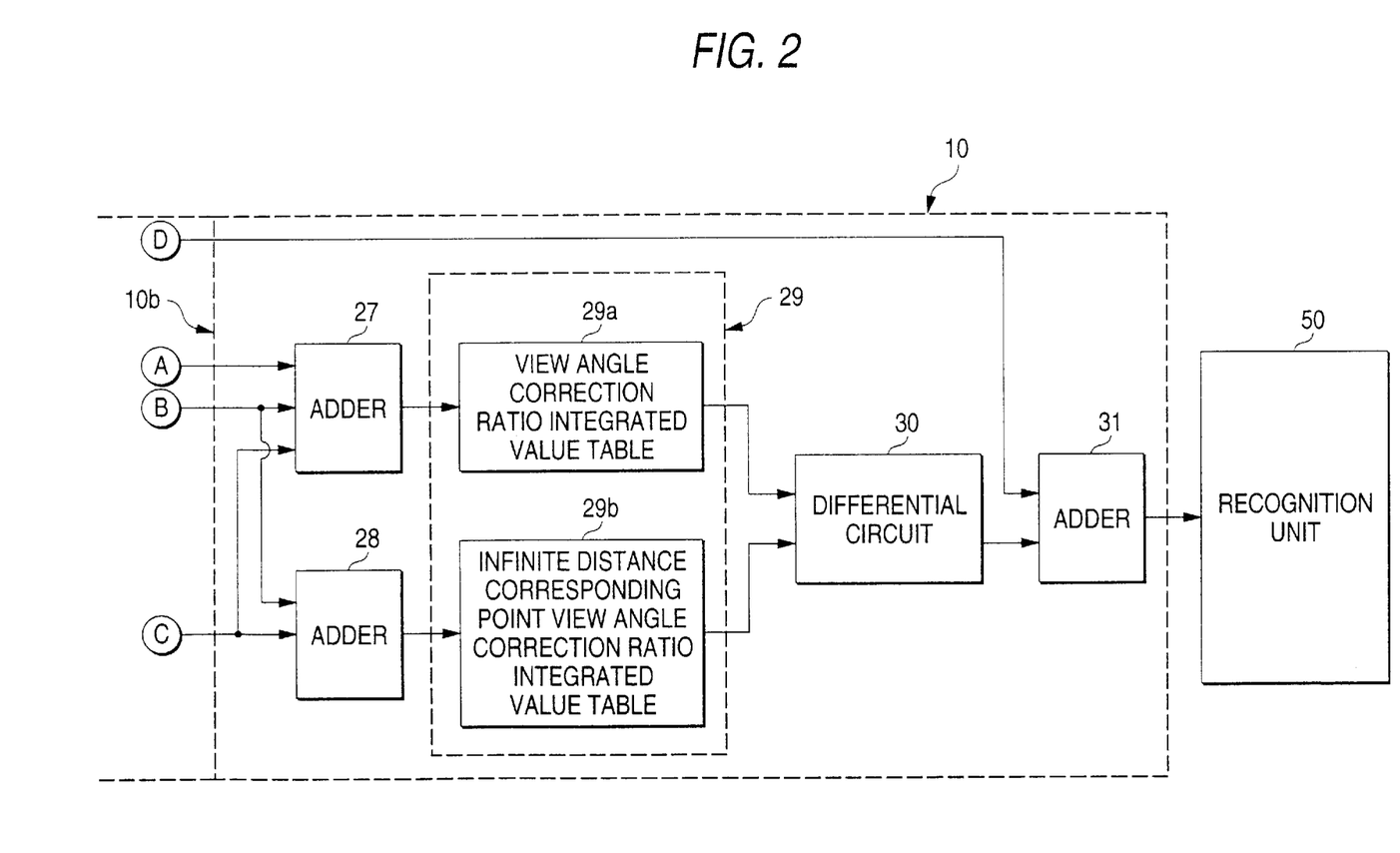
FIG. 2 is a circuit block diagram of the stereoscopic image processing apparatus (continued)
Figure 3:
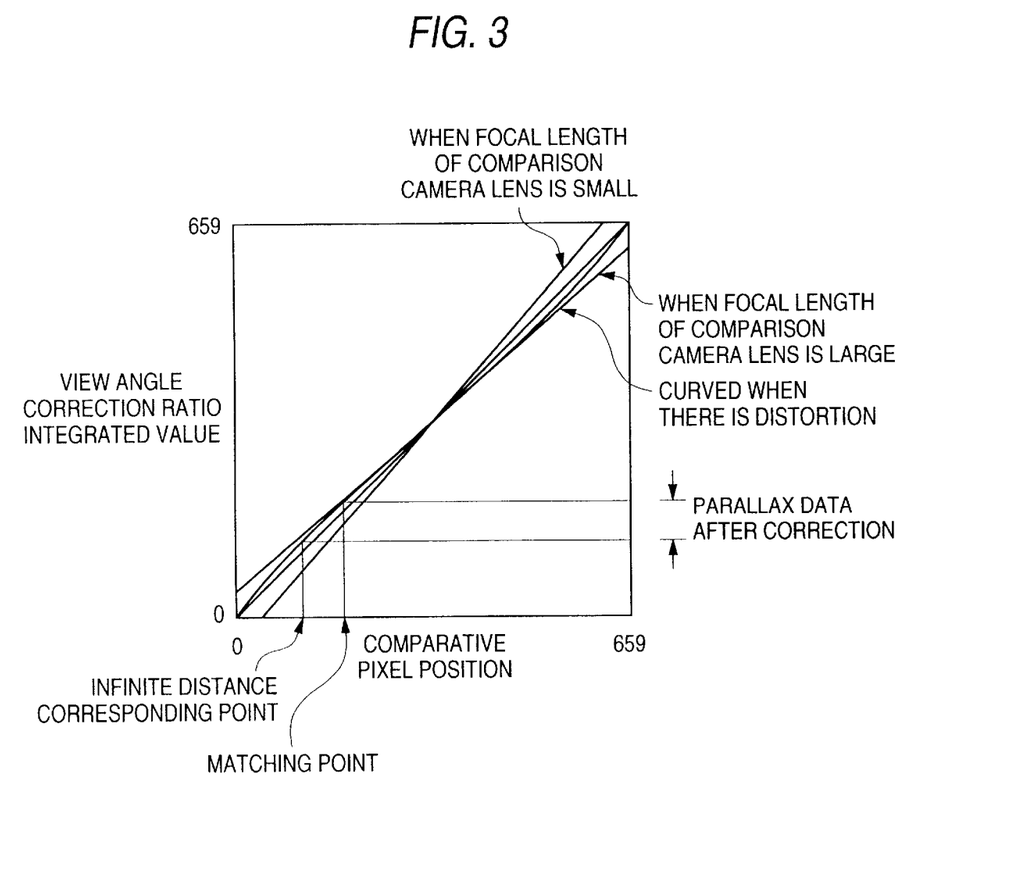
FIG. 3 is an explanatory diagram showing characteristics of view angle correction ratio integrated values according to actual view angles.
Figure 4:
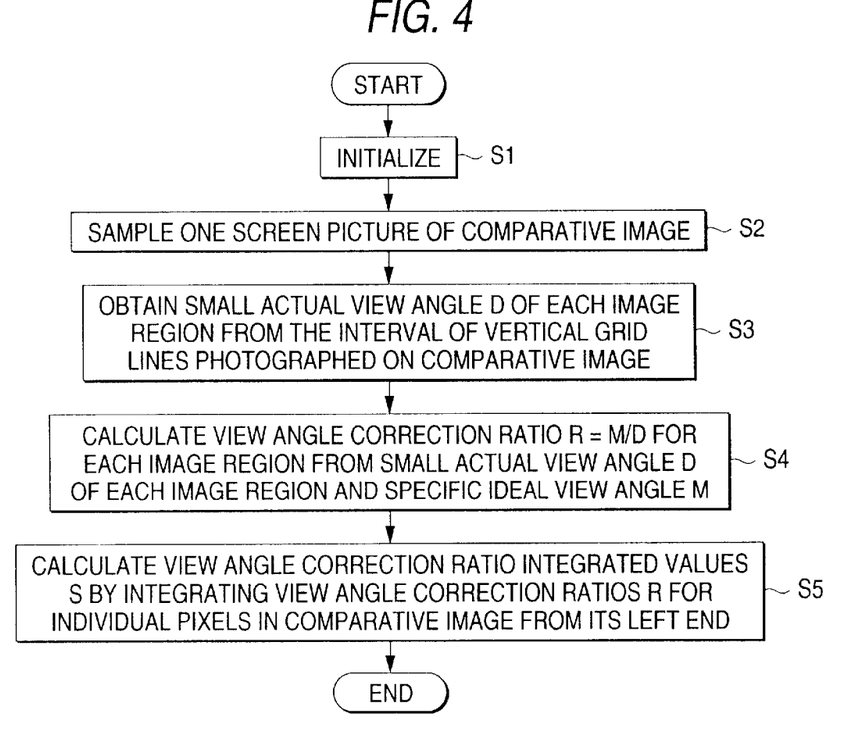
FIG. 4 is a flowchart of an operation for calculating correction data according to the actual view angles of a comparative image.
Figure 5:
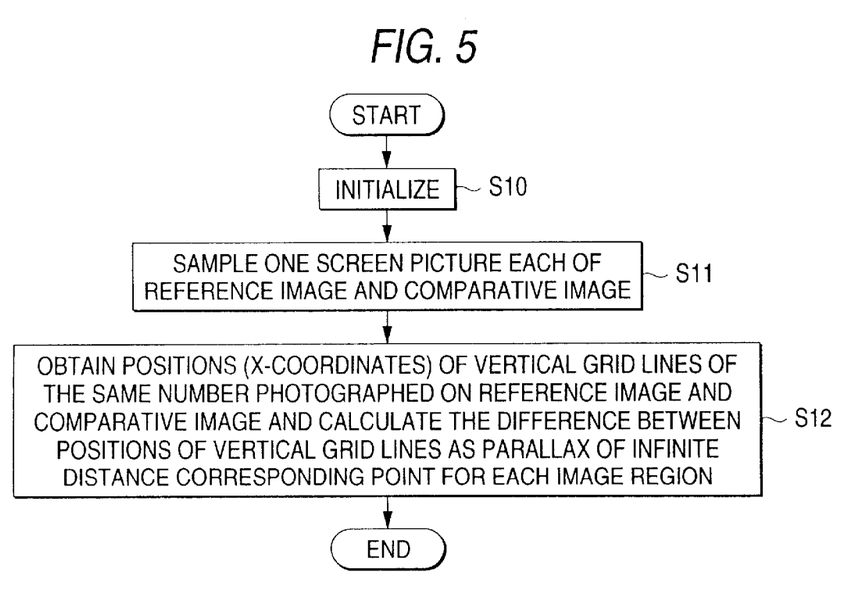
FIG. 5 is a flowchart of an operation for calculating the amount of displacement of infinite distance corresponding points.
Figure 6:
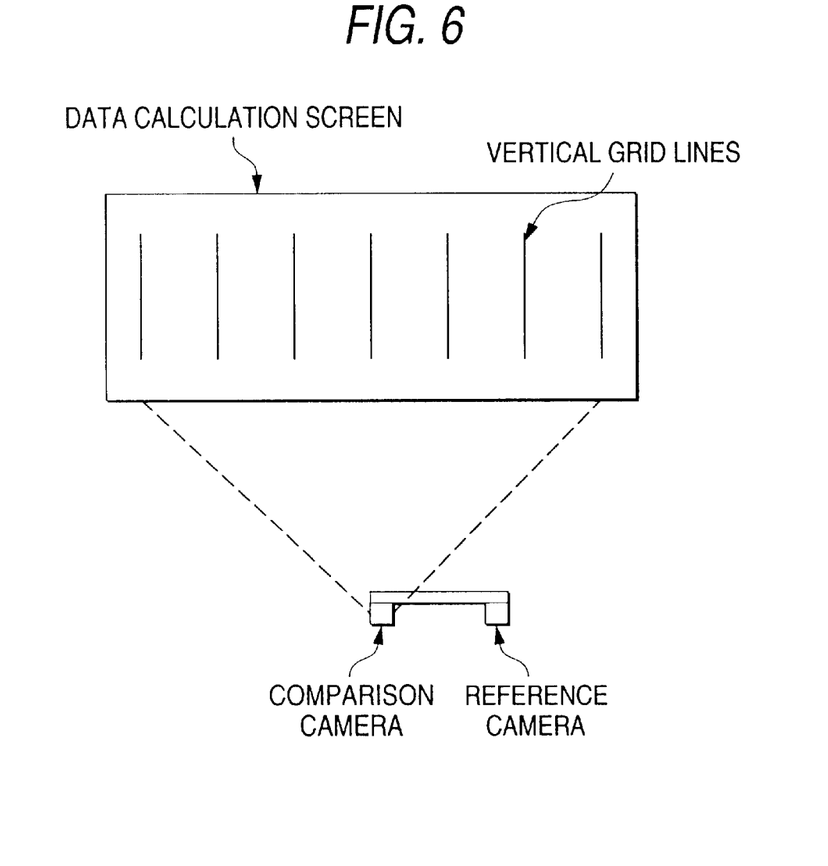
FIG. 6 is an explanatory diagram showing measurement of view angle correction ratios of the comparative image.
Figure 7:
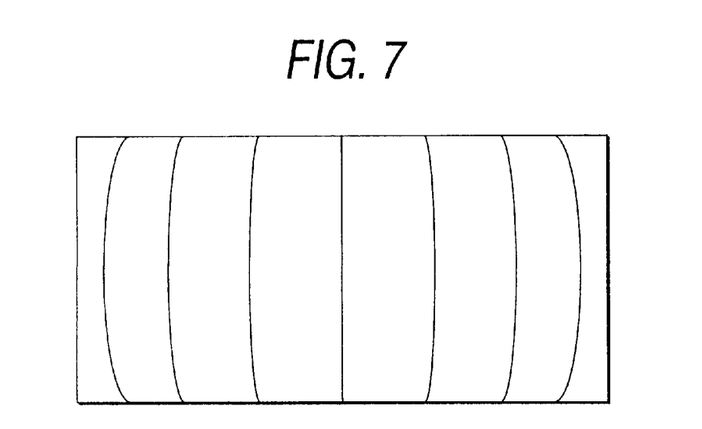
FIG. 7 is an explanatory diagram showing vertical grid lines for measurement of the view angle correction ratios photographed in the comparative image.
Figure 8:
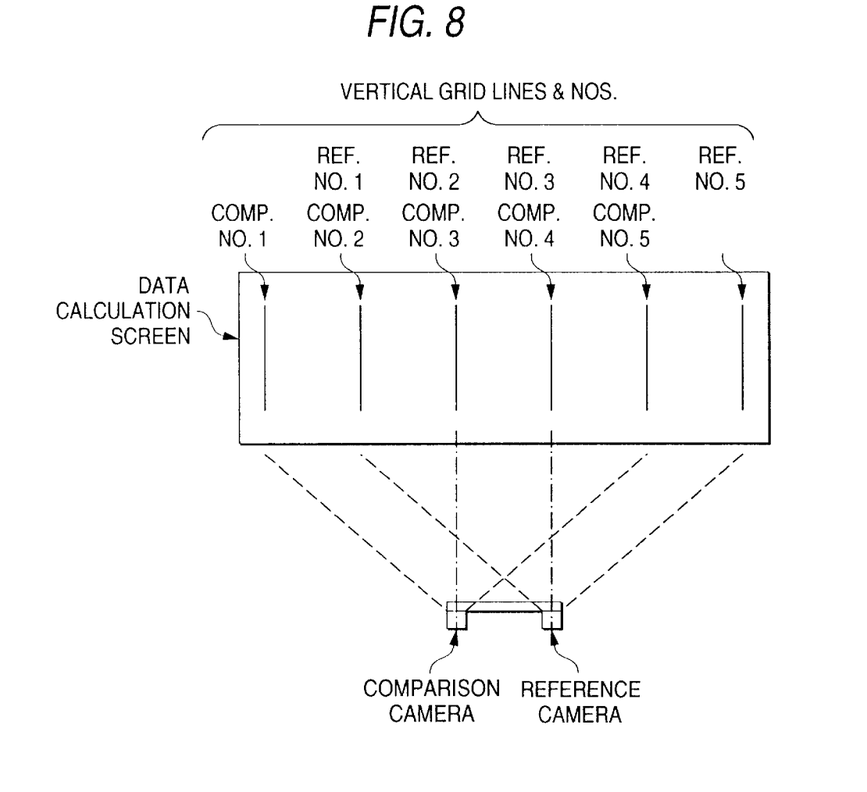
FIG. 8 is an explanatory diagram showing measurement of parallaxes based on the infinite distance corresponding points.
Figure 9:
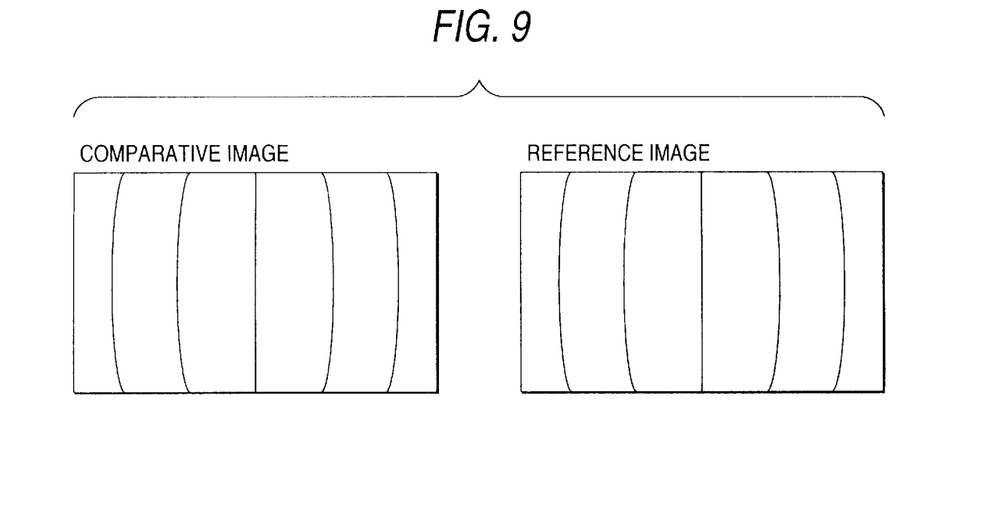
FIG. 9 is an explanatory diagram showing the vertical grid lines photographed in the reference image and in the comparative image.

A mode of carrying out the present invention, or an embodiment thereof, is described below with reference to drawings. FIGS. 1–9 relate to an embodiment of this invention. FIGS. 1 and 2 are circuit block diagrams of a stereoscopic image processing apparatus. FIG. 3 is an explanatory diagram showing characteristics of view angle correction ratio integrated values according to actual view angles. FIG. 4 is a flowchart of an operation for calculating correction data according to the actual view angles of a comparative image, and FIG. 5 is a flowchart of an operation for calculating the amount of displacement of infinite distance corresponding points. FIG. 6 is an explanatory diagram showing measurement of view angle correction ratios of the comparative image, and FIG. 7 is an explanatory diagram showing vertical grid lines for measurement of the view angle correction ratios photographed in the comparative image. FIG. 8 is an explanatory diagram showing measurement of parallaxes based on the infinite distance corresponding points, and FIG. 9 is an explanatory diagram showing the vertical grid lines photographed in the reference image and in the comparative image.

In FIG. 1, designated by the numeral 1 is a stereo camera apparatus which is installed on a mobile unit such as a motor vehicle or a helicopter, for instance. The stereo camera apparatus serves as a distance-measuring sensor for a system which recognizes a surrounding environment or own position based on three-dimensional distance information. This stereo camera apparatus 1 is constructed of a set of two cameras 2, 3 which are synchronized with each other and whose shutter speed is variable. One camera 2 is a reference camera for photographing a reference image to be used when performing stereo processing operation and the other camera 3 is a comparison camera for photographing a comparative image to be used when performing the stereo processing operation. The two cameras 2, 3 are mounted on a camera stay 4 with a predetermined baseline length between them.

A pair of reference image and comparative image photographed by the stereo camera apparatus 1 are subjected to stereo matching in the stereoscopic image processing apparatus 10 and parallax data is thereby obtained as three-dimensional distance information. Further, the parallax data obtained is read into a recognition unit 50 in which various recognizing operations are performed. When the invention is applied to a motor vehicle, for example, the recognition unit 50 recognizes a traffic environment such as road shapes and the presence of vehicles ahead on the basis of the three-dimensional distance information given by the parallax data. Then the recognition unit 50 produces vehicle control data for generating a warning to a driver upon judging the degree of risk of collision, stopping the motor vehicle by automatically activating its brakes, or for automatically increasing or decreasing running speed to maintain a safe distance to a vehicle running ahead.

The two cameras 2, 3 constituting the stereo camera apparatus 1 are mechanically adjusted in a production step such that their optical axes become parallel to each other and fixed to the camera stay 4. However, there exist relative minor variations in shooting directions of the two cameras 2, 3 due to limitations in the accuracy of mechanical assembly and therefore their optical axes do not become perfectly parallel to each other. In addition, there always exist not little optically nonlinear positional deviations in images photographed by the two cameras 2, 3 due to the presence of influence of a difference in the focal lengths of lenses between the two cameras 2, 3 or distortion of the lenses. The optically nonlinear positional deviations similarly exist in each stereo camera apparatus 1.

For the optically nonlinear positional deviations, errors occur in the parallax data in a stereo matching in which a search is carried out to determine a small region in the comparative image corresponding to a small region set in the reference image so as to extract such a matching small region. Thus, even when an object existing at the same distance is photographed, an equidistant surface obtained does not form a flat plane, resulting in a deterioration of the accuracy of distance.

Accordingly, the stereoscopic image processing apparatus 10 of this invention comprises a parallax detecting section 10*a* (refer to FIG. 1) and a parallax correcting section 10*b* (refer to FIG. 2). The parallax detecting section 10*a* processes images photographed by the stereo camera apparatus 1 and detects parallaxes by the stereo matching. The parallax correcting section 10*b* (refer to FIG. 2) corrects the parallax data detected by the parallax detecting section 10*a* using a view angle correction ratio table produced by previously measuring the small actual view angle of each of predetermined regions in the comparative image. The influence of the difference in the focal lengths of the lenses and the distortion of the lenses, and of the relative variations in the shooting directions of the two cameras 2, 3 is excluded by correcting the parallax data which are obtained from the reference image and the comparative image by the stereo matching performed with the parallax detecting section 10*a*, so as to achieve an improvement in the accuracy of distance.

The view angle correction ratio table is a data table for correction produced by previously measuring the small actual view angle D of each of the predetermined regions in the comparative image and defining the ratio of the small actual view angle D to a ideal view angle M as a view angle correction ratio R. The ideal view angle M is obtained in a case where optical positions of the two cameras 2, 3 are in an ideal state. In this embodiment, considering that the parallax data corresponds to a value obtained by integrating the difference between view angles of adjacent pixels in a scanning direction for parallax detection, the view angle correction ratio table holds a value obtained by integrating view angle correction ratio R of each successive pixel from an origin of an image coordinate as a view angle correction ratio integrated value S. Thus the view angle correction ratio integrated value S can directly correct the parallax data obtained by the stereo matching.

More specifically, under ideal conditions where the lenses of the two cameras 2, 3 constituting the stereo camera apparatus have the same focal length and are free of distortion, and their shooting directions are completely same, it is possible to directly use as the parallax data the difference between a matching point (or a point of the small region in the comparative image corresponding to the small region set in the reference image) and an infinite distance corresponding point (or a point on horizontal coordinate in the comparative image obtained when the object is located at an infinite distance) on a horizontal coordinate (pixel position) in the comparative image as shown in FIG. 3. In a case where the focal length of the lens of the comparison camera (camera 3) differs from the focal length of the lens of the reference camera (camera 2), however, a characteristic given by a view angle correction ratio integrated value S becomes a straight line offset from the coordinate origin. Also, if there is a lens distortion, the characteristic given by the view angle correction ratio integrated value S becomes a curved line.

Thus, it becomes possible to correct the matching point and the infinite distance corresponding point of the comparative image obtained by conventional stereo matching with a characteristic curve of the view angle correction ratio integrated value S including the difference in the focal length of the lenses, the influence of the lens distortion, the difference in the shooting direction, etc. Moreover, operation to make up for the difference in the focal length of the lenses, the influence of the lens distortion and the difference in the shooting direction is not performed by conducting a non-linear image transformation prior to stereo matching, so that there is no deterioration in image quality and distance-measuring operation can be done using high-quality images. This serves to improve the accuracy of distance measurement as well as the reliability of data.

A detailed construction of the stereoscopic image processing apparatus 10 is now described in the following. The parallax detecting section 10*a* is constructed mainly of analog-to-digital (A/D) converters 11, 12, image memories 13, 14, a position/shape correction circuit 15, a sensitivity correction circuit 16, a reference image line memory 17, a comparative image line memory 18, a degree-of-matching calculation circuit 25, and a degree-of-matching evaluation circuit 26. The A/D converters 11, 12 and image memories 13, 14 are provided to each line of the individual cameras 2, 3. The position/shape correction circuit 15 executes a geometrical positional correction to images stored in the individual image memories 13, 14. The sensitivity correction circuit 16 executes an optical sensitivity correction to the images output from the position/shape correction circuit 15. The reference image line memory 17 and the comparative image line memory 18 are respectively store data for one line for the stereo processing operation. The degree-of-matching calculation circuit 25 calculates city block distances for individual small regions of the reference image and the comparative image. The degree-of-matching evaluation circuit 26 obtains parallax data in pixel units by detecting a minimum value of the city block distances and obtains sub-pixel data of a resolution equivalent to one pixel of less by a sub-pixel operation.

The parallax detecting section 10*a* is further provided with a brightness change validity judgment circuit 19, and a reference image small region position generating circuit 20, a read/write address generating circuit 21, a write address generating circuit 22, an offset correction table 23 and a read S address generating circuit 24 in order to generate addresses for accessing individual memories. The brightness change validity judgment circuit 19 examines the amount of brightness changes in image data output from the sensitivity correction circuit 16 to the reference image line memory 17 and judges whether a valid amount of brightness changes for the stereo processing operation has been obtained. The reference image small region position generating circuit 20 generates the positions of the small regions in the reference image for evaluating the degree of matching between the reference image and the comparative image. The read/write address generating circuit 21 generates addresses for accessing the image memories 13, 14 according to the positions of the small regions generated by the reference image small region position generating circuit 20. The write address generating circuit 22 generates write addresses according to the addresses fed from the read/write address generating circuit 21. The offset correction table 23 determines the amount of offset for shifting a search area for small region matching in the comparative image according to the position of the small region in the reference image. The read address generating circuit 24 generates read addresses of the comparative image line memory 18 based on the position of the small region fed from the reference image small region position generating circuit 20 and an offset value fed from the offset correction table 23.

On the other hand, the parallax correcting section 10*b* is constructed of an adder 27, an adder 28, a view angle correction ratio table 29, a differential circuit 30, and an adder 31. The adder 27 adds the parallax data from the degree-of-matching evaluation circuit 26, the position of the small region fed from the reference image small region position generating circuit 20 and the offset value fed from the offset correction table 23 and outputs their sum. The adder 28 adds data on the position of the small region fed from the reference image small region position generating circuit 20 and the offset value fed from the offset correction table 23 and outputs their sum. The view angle correction ratio table 29 corrects the parallax data from the degree-of-matching evaluation circuit 26 according to output data from the adders 27, 28. The differential circuit 30 calculates the difference between outputs from the view angle correction ratio table 29. The adder 31 adds the sub-pixel data calculated by the degree-of-matching evaluation circuit 26 to data from the differential circuit 30 and output their sum as corrected parallax data.

The view angle correction ratio table 29, which is used for reference with a matching point coordinate of the comparative image and for reference with an infinite distance corresponding point coordinate of the comparative image, may essentially be a single table. However, since correction to the infinite distance corresponding point is primarily independent of correction to the matching point coordinate, the view angle correction ratio table 29 is held as a combination of two tables in this embodiment. That is, a view angle correction ratio integrated value table 29a is referenced with the matching point coordinate of the comparative image, and an infinite distance corresponding point view angle correction ratio integrated value table 29b is simplified by limiting its use to reference with the infinite distance corresponding point. By using combination of two tables, it is possible to achieve an improvement in processing speed in this embodiment.

In the aforementioned stereoscopic image processing apparatus 10, analog images photographed by the two cameras 2, 3 are converted into digital images of predetermined brightness levels(e.g., 256 gray scale levels) by the A/D converters 11, 12 and digital image data thus converted are individually stored in the addresses of the image memories 13, 14 addressed by the read/write address generating circuit 21.

The image data stored in the individual image memories 13, 14 are subjected to a geometrical correction by an affine transformation performed by the position/shape correction circuit 15 to make up for deviations of optical positions of the two cameras 2, 3. Further, after the image data are sensitivity-corrected, image data for one line each for the stereo processing operation is stored in the reference image line memory 17 and the comparative image line memory 18. The sensitivity correction, such as a sensitivity correction, a shading compensation and a logarithmic correction, uses an LUT (look-up table) to correct a difference in characteristic gains of charge-coupled-device (CCD) amplifiers of the individual cameras 2, 3. The shading compensation is used for correcting a reduction in brightness due to a shading phenomenon which occurs in an optical system of the individual cameras 2, 3. The logarithmic correction is used for improving contrast of low-brightness portions of the individual images. The reference image line memory 17 stores image data for a small region (e.g., a region of 4×4 pixels) which is subjected to the stereo processing operation, while the comparative image line memory 18 stores image data for just a predetermined search area which is needed for searching for a corresponding position of one small region.

Subsequently, the degree-of-matching calculation circuit 25 calculates city block distances for the image data of the small region stored in the reference image line memory 17 while successively shifting image data of the comparative image. The data to be shifted is read out from the comparative image line memory 18 with its reading start address given by adding the offset value fed from the offset correction table 23 to the coordinate (horizontal coordinate) in the scan direction of parallax detecting. The city block distances are calculated by using an arithmetic circuit having a pipeline structure in which absolute value calculating circuits and adders, for example, are connected in pyramid form.

The degree-of-matching evaluation circuit 26 detects the minimum value of the city block distances calculated by the degree-of-matching calculation circuit 25 and this minimum value is output as parallax data (the amount of pixel deviation for each small region between the reference image and the comparative image). At the same time, the degree-of-matching evaluation circuit 26 calculates sub-pixel data of the resolution equivalent to one pixel of less by performing the sub-pixel operation to interpolate the discrete city block distances which are calculated in pixel units. In a case where the amount of brightness change in the image data of the reference image line memory 17 is judged to be less than a valid value by the brightness change validity judgment circuit 19, the degree-of-matching evaluation circuit 26 outputs the parallax data and sub-pixel data as invalid data.

The adder 27 of the parallax correcting section 10b adds the position of the small region fed from the reference image small region position generating circuit 20 and the off set value fed from the offset correction table 23 to the parallax data detected by the degree-of-matching evaluation circuit 26, or the parallax data in pixel units (the amount of pixel deviation) obtained by the stereo matching. Then the sum is output as the horizontal coordinate of a matching point of the small region in the comparative image corresponding to the small region in the reference image. Then, the view angle correction ratio integrated value table 29a is referred to this horizontal coordinate of the matching point, whereby a horizontal coordinate of a matching point is individually obtained which is corrected for the influence of the difference in the focal length of the lenses and the distortion of the lenses and for the influence of the relative variations in the shooting directions of the two cameras 2, 3.

At the same time, the adder 28 of the parallax correcting section 10b adds the position of the small region fed from the reference image small region position generating circuit 20 and the offset value fed from the offset correction table 23 to obtain the coordinate of an infinite distance corresponding point. Then, the infinite distance corresponding point view angle correction ratio integrated value table 29b is referred to this coordinate of the infinite distance corresponding point. As a consequence, a horizontal coordinate of an infinite distance corresponding point is similarly individually obtained which is corrected for the influence of the difference in the focal length of the lenses and the distortion of the lenses and for the influence of the relative variations in the shooting directions of the two cameras 2, 3.

Then, the differential circuit 30 calculates the difference between the horizontal coordinate of the corrected matching point and the horizontal coordinate of the corrected infinite distance corresponding point which have been obtained by reference to the view angle correction ratio integrated value table 29a and the infinite distance corresponding point view angle correction ratio integrated value table 29b. The adder 31 adds the value of this difference and the sub-pixel data obtained by the degree-of-matching evaluation circuit 26 and outputs their sum as true parallax data (corrected parallax data) to the recognition unit 50.

Here, by increasing the resolution of the view angle correction ratio integrated value table 29a to sub-pixel units, it is possible to eliminate the adder 31 which adds the difference value fed from the differential circuit 30 and the sub-pixel data fed from the degree-of-matching evaluation circuit 26. In this case, the sub-pixel data calculated by the degree-of-matching evaluation circuit 26 is entered to the adder 27 and horizontal coordinates of matching points which are a reference parameter of the view angle correction ratio integrated value table 29a are set in sub-pixel values.

Here, the view angle correction ratio integrated value table 29a and the infinite distance corresponding point view angle correction ratio integrated value table 29b are actually produced by previously photographing a data calculation screen on which specific patterns are arranged by each stereo camera apparatus 1 and writing data obtained on the basis of the image photographed in the individual tables 29a, 29b which are made of flash memories, for example.

In this embodiment, a data calculation screen on which vertical grid lines are arranged at equal intervals as shown in FIGS. 6 and 8 for generating the view angle correction ratio integrated value table 29a and the infinite distance corresponding point view angle correction ratio integrated value table 29b. This screen is placed parallel to the baseline of the stereo camera apparatus 1 at a known distance therefrom and photographed.

First, operation of FIG. 4 for generating the view angle correction ratio integrated value table 29a by calculating correction data obtained from actual view angles of the comparative image is explained. In this operation, the values, such as the values of specification constants of the stereo camera apparatus 1 or variable values of various processing, are initialized in step S1. Then the data calculation screen shown in FIG. 6 is photographed and one screen picture of the comparative image is sampled in step S2.

Next, the operation flow proceeds to step S3, in which small actual view angles D of individual image regions are obtained from the interval of the vertical grid lines photographed on the comparative image. Then in step S4, the view angle correction ratio R (=M/D) is calculated for each image region from the small actual view angle D of each image region and a specific ideal view angle M defined in specifications. If there exists a lens distortion, the vertical grid lines photographed on the comparative image show a progressively greater curvature toward both lateral ends of the image as shown in FIG. 7. It is then possible to obtain view angle correction ratios from the intervals of horizontal coordinates of images of the curved vertical grid lines and the intervals of the actual vertical grid lines on the data calculation screen.

Then, the operation flow proceeds to step S5, in which the view angle correction ratio integrated values S are calculated by integrating the view angle correction ratios R for the individual pixels in the comparative image from its left end (initial value position) in the horizontal scanning direction. The table is produced by writing the view angle correction ratio integrated values S in the view angle correction ratio integrated value table 29a corresponding to the horizontal coordinates.

On the other hand, the infinite distance corresponding point view angle correction ratio integrated value table 29b is generated by placing the data calculation screen parallel to the stereo camera apparatus 1 with the interval of the vertical grid lines on the data calculation screen made equal to the baseline length of the stereo camera apparatus 1 as shown in FIG. 8 and performing an operation for calculating the amount of displacement of infinite distance corresponding points as shown in FIG. 5. In this operation, numbers are assigned to the individual vertical grid lines on the data calculation screen separately on the reference image and the comparative image in such a manner that the number assigned to each vertical grid line photographed on the reference image is one less than the number assigned to the same vertical grid line photographed on the comparative image as shown in FIG. 8.

The values, such as the values of specification constants of the stereo camera apparatus 1 or variable values of various processing variables, have been initialized in step S10 as described above. Then the data calculation screen shown in FIG. 8 is photographed to obtain photographed images of the reference image and the comparative image as shown in FIG. 9 and one screen picture of each image is sampled in step S11.

In step S12, the positions (coordinates in the horizontal scanning direction; X-coordinates) of the vertical grid lines of the same number photographed on the reference image and the comparative image are obtained, the difference between the positions of the vertical grid lines is calculated as the parallax of the infinite distance corresponding point for each image region, and the table is produced by writing the parallax the infinite distance corresponding point view angle correction ratio integrated value table 29a.

As thus far described, parallax data obtained by searching for corresponding small regions in a pair of images including a reference image and a comparative image photographed by a stereo camera apparatus is corrected according to the ratio of a small actual view angle of each predetermined region corresponding to the comparative image to the ideal view angle of each region when optical positions of individual cameras of the stereo camera apparatus are in an ideal state according to the present invention. Therefore, it is possible to obtain such advantageous effects that parallax detection errors caused by variations in lens properties or relative variations in shooting directions of two cameras constituting the stereo camera apparatus can be corrected and an improvement in the accuracy of distance measurement can be achieved.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A stereoscopic image processing apparatus comprising:
    a search unit for searching a corresponding small region in a comparative image corresponding to a small region in a reference image, the comparative image and the reference image being photographed with a stereo camera apparatus;
    a parallax calculating unit for obtaining a parallax data of the small regions; and
    a parallax correcting unit for correcting the parallax data based on ratios of view angles, the ratio of view angles being a ratio of a small actual view angle of each predetermined region in the comparative image to an ideal view angle of the each predetermined region when optical position of the stereo camera apparatus is in an ideal state.

2. The stereoscopic image processing apparatus as recited in claim 1, wherein said parallax correcting unit corrects the parallax data on the basis of the ratio of view angles corresponding to a matching point in the comparative image where the corresponding small region matches with the small region in the reference image, and the ratio of view angles corresponding to an infinite distance corresponding point for the small region.

3. The stereoscopic image processing apparatus as recited in claim 1, wherein said parallax correcting unit has a correction data table based on the ratio of view angles, and corrects the parallax data in reference to correction data of said correction data table.

4. The stereoscopic image processing apparatus as recited in claim 3, wherein said correction data table includes a first table to be referenced at matching points in the comparative image where the corresponding small regions match with the small regions in the reference image and a second table to be referenced at infinite distance corresponding points.

5. The stereoscopic image processing apparatus as recited in claim 1, wherein said parallax correction unit corrects the parallax data based on integrated values obtained by integrating the ratio of the view angles from an side edge of the comparative image.

6. The stereoscopic image processing apparatus as recited in claim 3, wherein correction data of said correction data table are integrated values obtained by integrating the ratio of the view angles from a side edge of the comparative image.

7. The stereoscopic image processing apparatus as recited in claim 4, wherein correction data of the first table and the second table are integrated values obtained by integrating the ratio of the view angles from a side edge of the comparative image.

8. A stereoscopic image processing method comprising:
searching a corresponding small region in a comparative image corresponding to a small region in a reference image, the comparative image and the reference image being photographed with a stereo camera apparatus;
obtaining a parallax data of the small regions; and
correcting the parallax data based on a ratio of view angles, the ratio of view angles being a ratio of a small actual view angle of each predetermined region in the comparative image to an ideal view angle of the each predetermined region when optical position of the stereo camera apparatus is in an ideal state.

9. The stereoscopic image processing method as recited in claim 8, wherein said step of correcting the parallax corrects the parallax data on the basis of the ratio of view angles corresponding to a matching point in the comparative image where the corresponding small region matches with the small region in the reference image, and the ratio of view angles corresponding to an infinite distance corresponding point.

10. The stereoscopic image processing method as recited in claim 8, wherein said step of correcting the parallax comprises:
preparing a correction data table based on the ratio of view angles; and
correcting the parallax based on correction data of the correction data table.

11. The stereoscopic image processing method as recited in claim 10, wherein said step of preparing correction data table prepares a first table to be referenced at matching points in the comparative image where the corresponding small regions match with the small regions in the reference image and a second table to be referenced at infinite distance corresponding points.

12. The stereoscopic image processing method as recited in claim 8, wherein said step of correction the parallax corrects the parallax data based on integrated values obtained by integrating the ratio of the view angles from an side edge of the comparative image.

13. The stereoscopic image processing method as recited in claim 10, wherein said step of correction the parallax prepares the correction data table based on integrated values obtained by integrating the ratio of the view angles from an side edge of the comparative image.

14. The stereoscopic image processing method as recited in claim 11, wherein said step of correction the parallax prepares the first table and the second table based on integrated values obtained by integrating the ratio of the view angles from an side edge of the comparative image.

* * * * *